C. H. OAKLEY.
MATTING.
APPLICATION FILED JAN. 12, 1911.

1,037,512.

Patented Sept. 3, 1912.

Witnesses:
Geo. Schwarz.
John Thompson

Inventor
Clifford H. Oakley
By his Attorneys
Emery Booth Janney & Varney

COLUMBIA PLANOGRAPH CO., WASHINGTON, D. C.

UNITED STATES PATENT OFFICE.

CLIFFORD H. OAKLEY, OF TRENTON, NEW JERSEY.

MATTING.

1,037,512.　　　Specification of Letters Patent.　　Patented Sept. 3, 1912.

Application filed January 12, 1911. Serial No. 602,153.

*To all whom it may concern:*

Be it known that I, CLIFFORD H. OAKLEY, a citizen of the United States, and a resident of the city of Trenton, in the county of Mercer and State of New Jersey, have invented certain new and useful Improvements in Matting, of which the following is a specification, reference being had to the accompanying drawings, forming a part hereof.

The invention relates to improvements in matting and more particularly to matting composed of a large number of comparatively small tread pieces generally of rubber or rubber composition.

The object of the improvements is to provide a convenient means for spacing the elements of the matting apart and for incorporating therewith, in such spaces as are provided between the elements, auxiliary or supplemental tread pieces or elements in order to produce a better tread surface.

The invention also includes the provision of an improved means of finishing the edges of the matting to the end that it shall taper off gradually and be reversible.

Figure 1:
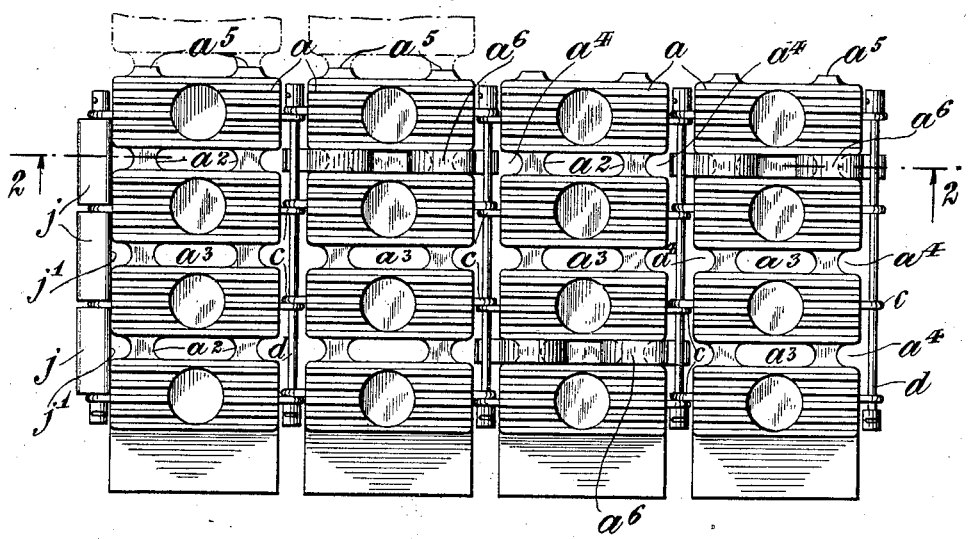
Figure 2:
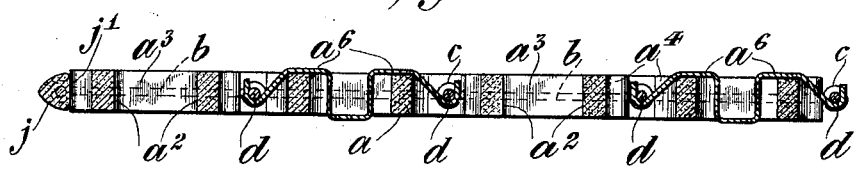

In the drawings: Figure 1 is a view in plan of a small section of matting embodying the improvements, and, Fig. 2 is a sectional view, the plane of which is indicated by the line 2—2 in Fig. 1.

As the general construction of matting illustrated in the drawings is specifically described in my application filed August 8, 1910, Serial No. 576,202, it will suffice to point out here that the separate tread pieces $a$ are molded about ribs $b$ terminating in eyes $c$ and united by rods $d$ which pass through the eyes, the tread pieces being preferably disposed in columns and rows and the rods lying between adjacent columns. As shown in the application referred to, as well as in the present application, several of the tread pieces in any column may be integral with each other for convenience in manufacturing and assembling. In the present case, the several tread pieces in any column are shown to be separated and spaced and held apart by small bridge pieces $a^2$, preferably two of which are employed between each two adjacent tread pieces $a$ so as to leave an intervening central space $a^3$ and end spaces $a^4$. These bridge pieces may be considered as projections from either or both of the pair of adjacent tread pieces, and where several tread pieces are joined together to form a multiple unit, the bridge pieces or projections will be unbroken. Where, however, as at $a^5$, one tread piece meets another, the bridge pieces will be severed either by dividing them in the middle as shown or in any other convenient place. By means of these projections or bridge-pieces the several units of each column are conveniently and effectively separated and held in proper relation to each other, it being immaterial whether said bridge pieces are integral with both of the adjacent tread pieces, or with only one of them, or are divided as shown at $a^5$.

Where the tread pieces $a$ are made of rubber as is generally the case, supplemental tread pieces of metal are often useful in making a better tread surface, and in the present case the projections $a^2$ and the rods $d$ provide a ready means for receiving and holding metallic strips $a^6$; for the latter may be bent around the projections in the spaces between the tread pieces so that each strip will have a portion thereof lying in the surface of both sides of the mat, and the ends of each strip may be made to embrace the rods $d$ on either side of the column in which they lie, being thus held firmly in place against the projections. For instance, upon reference to the drawings it will be seen that the middle portion of each strip is looped so as to fit into central space between the two adjacent tread pieces; then the strip is bent around the projections $a^2$ on each side and finally the ends are brought down under and around the rods $d$. In assembling the strips, they are simply laid between the tread pieces wherever desired, before the rods $d$ are run in through the eyes $c$. Said strips are preferably made by flattening steel wire, cutting the same to size and bending it into the proper shape.

The ends of the matting should be formed with a taper in order to best adapt it for practical conditions of use, and for this purpose it is preferable to have a strip with a double taper so that the mat may be reversible. I therefore employ a number of short pieces $j$ having a taper on each side and a flat back $j'$ which is adapted to fit squarely against the matting-end. When these pieces are held in position by the rods $d$ on the ends, one between each two adjacent pair of eyes, their flat backs will hold them immovable and prevent them from bending up or getting caught underneath the mat.

I claim as my invention:

1. A matting having a plurality of tread pieces provided with projections, and means to fasten said tread pieces together, the fastening means separating the tread pieces along two opposite sides and the projections separating said pieces along the other two sides.

2. A matting having a plurality of tread pieces provided with projections and arranged in columns and rows, and fastening means consisting of eyes and rods passing through the eyes, the eyes being secured to the tread pieces so as to lie in the spaces between the columns, and the projections lying in the spaces between the rows and separating and spacing the tread pieces apart.

3. A matting having a plurality of tread pieces, projections on the tread pieces arranged to separate and space the same apart on two opposite sides, fastening means including rods along the other two sides, and a supplemental tread piece bent around at least one projection between two adjacent tread pieces the ends of which supplemental tread piece embrace the respective rods on each side.

4. A matting having a plurality of tread pieces arranged in columns and each adjacent pair of which in the same column has two projections separating and spacing them apart, rods in the spaces between the columns to unite the pieces together, and supplemental tread strips each of which is disposed between two adjacent tread pieces, such strip being bent around the two projections separating said pieces so as to form a part of the surface of each side of the matting and the ends of such piece embracing the respective rods on each side of the column in which it lies.

5. A matting having a plurality of end pieces tapered on both sides, eyes projecting from the end of the matting, and a rod passing through the eyes and upon which the end pieces are disposed one such piece between each two adjacent eyes, the said pieces having flat backs which are held against the matting-end by the rods.

This specification signed and witnessed this 16th day of December, A. D., 1910.

CLIFFORD H. OAKLEY.

Signed in the presence of—
John W. Thompson,
Lucius E. Varney.

---

Copies of this patent may be obtained for five cents each, by addressing the "Commissioner of Patents, Washington, D. C."